Aug. 15, 1950  G. S. COLEY ET AL  2,518,757
VEGETABLE CANNING DEVICE
Filed Jan. 29, 1946  3 Sheets-Sheet 1

INVENTORS
GEORGE SIDNEY COLEY
JOHN SOUSA
BY
Naylor and Lassagne
ATTORNEYS

Aug. 15, 1950

G. S. COLEY ET AL 2,518,757

VEGETABLE CANNING DEVICE

Filed Jan. 29, 1946

3 Sheets-Sheet 2

INVENTORS
GEORGE SIDNEY COLEY
JOHN SOUSA
BY
Naylor and Lassagne
ATTORNEYS

Aug. 15, 1950     G. S. COLEY ET AL     2,518,757
VEGETABLE CANNING DEVICE
Filed Jan. 29, 1946     3 Sheets-Sheet 3
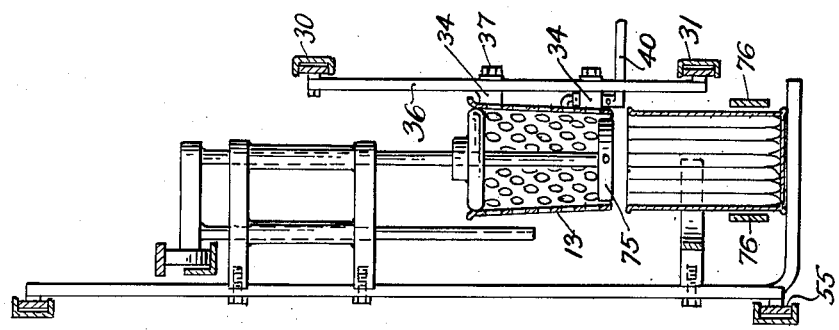
Fig. 8.
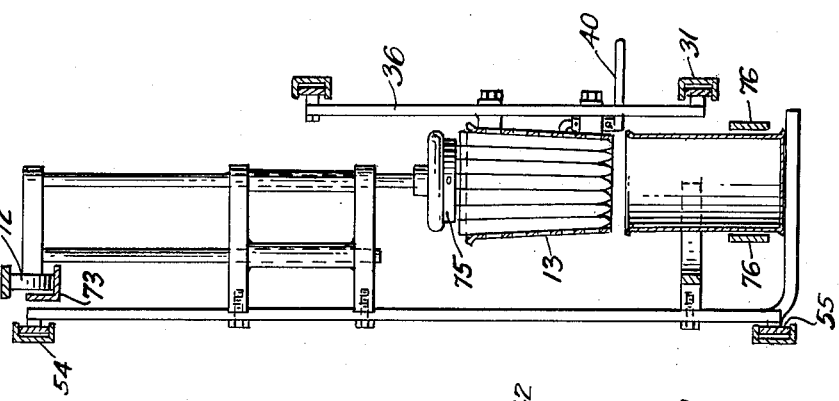
Fig. 7.
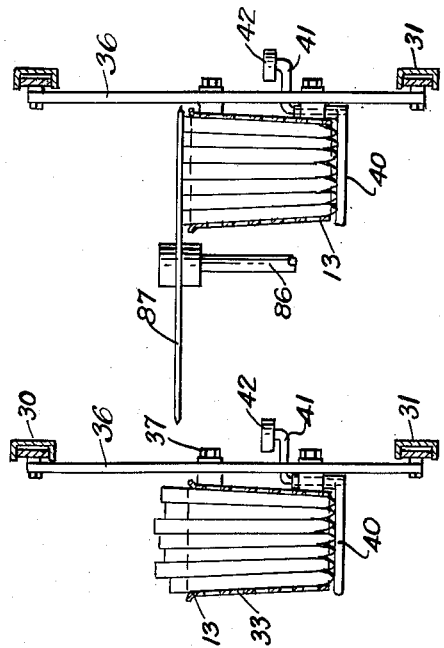
Fig. 6.
Fig. 5.
INVENTORS
GEORGE SIDNEY COLEY
JOHN SOUSA
BY
*Naylor and Lassagne*
ATTORNEYS Patented Aug. 15, 1950

2,518,757

UNITED STATES PATENT OFFICE 2,518,757

VEGETABLE CANNING DEVICE

George Sidney Coley, San Jose, and John Sousa, Mountain View, Calif., assignors to Schuckl & Co., Inc., a corporation of California Application January 29, 1946, Serial No. 644,102

7 Claims. (Cl. 226—103)

This invention relates to vegetable canning machinery and more particularly to equipment for canning stalk vegetables, such as asparagus, celery, and the like.

It is an object of this invention to provide an apparatus which will automatically trim the vegetable to the desired length and deposit it in the cans for further processing. It is a further object of this invention to provide a machine which will require merely the manual delivery of predetermined quantities or measures of the stalk vegetables into traveling receptacles in the machine for certain preliminary treatment and the wholly automatic charging of the cans from such receptacles.

Other objects of this invention will become more apparent as this specification proceeds and the novelty of the device will be pointed out in the appended claims with the requisite degree of particularity.

Figure 1:
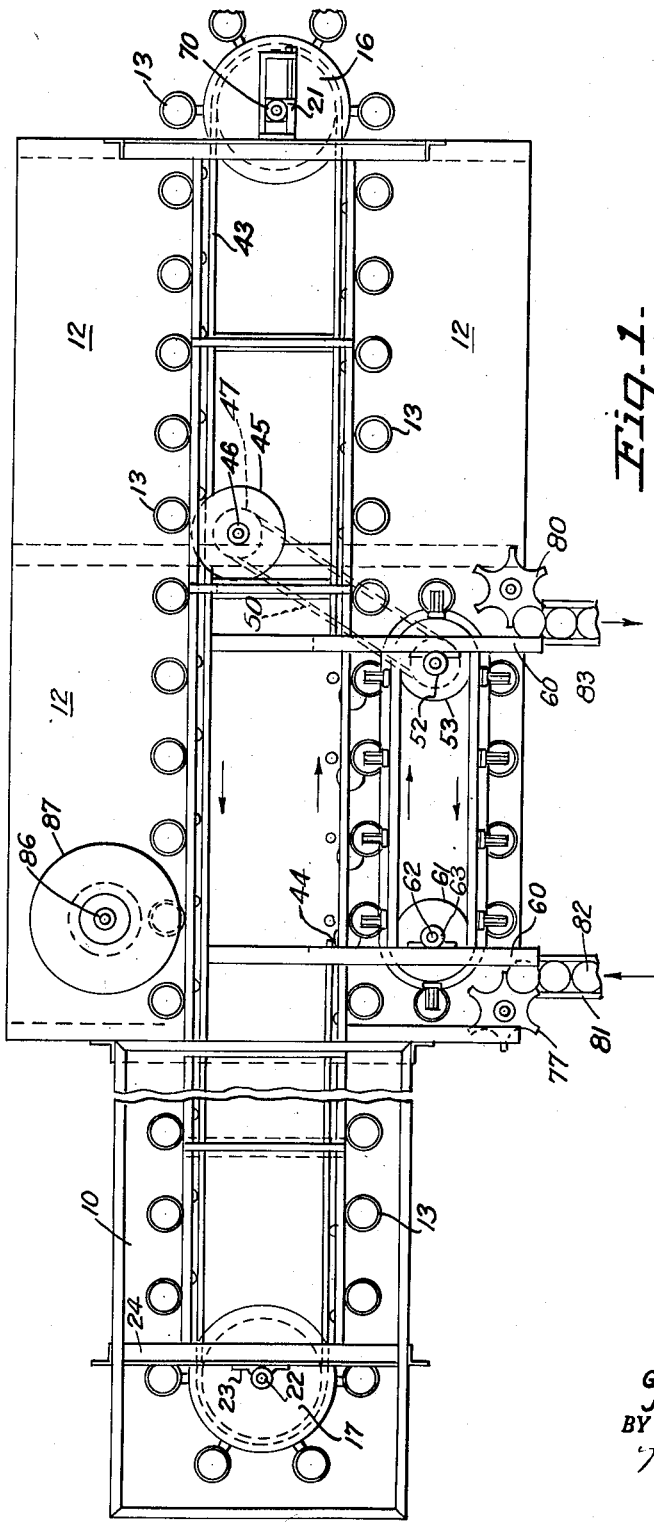
Figure 2:
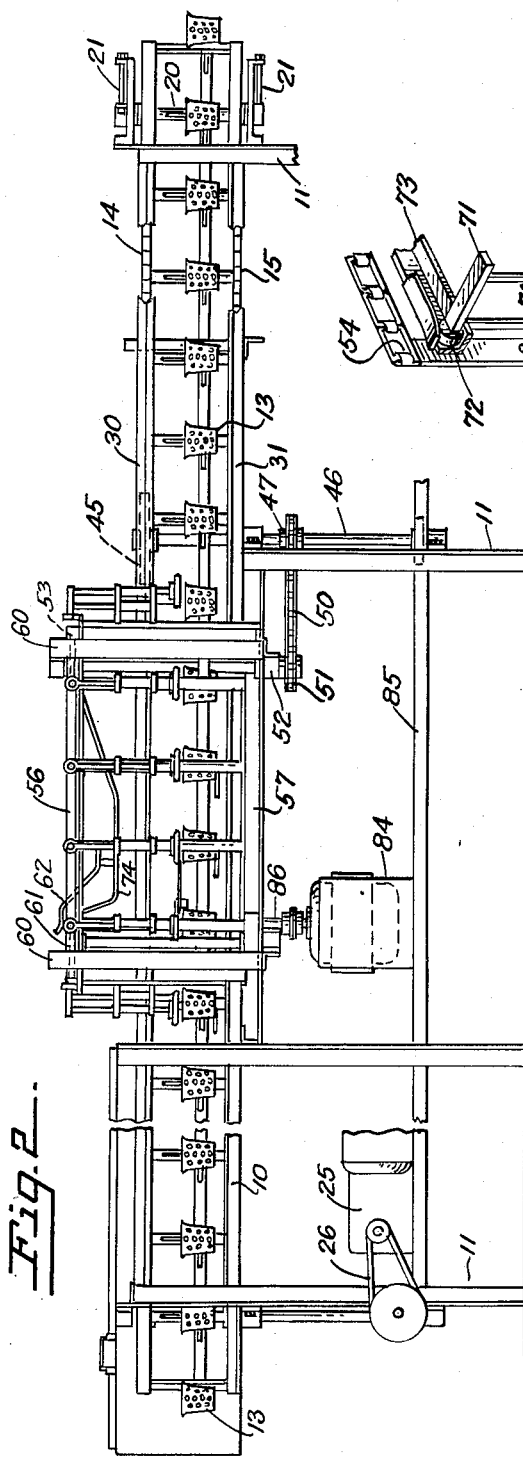
Figure 3:
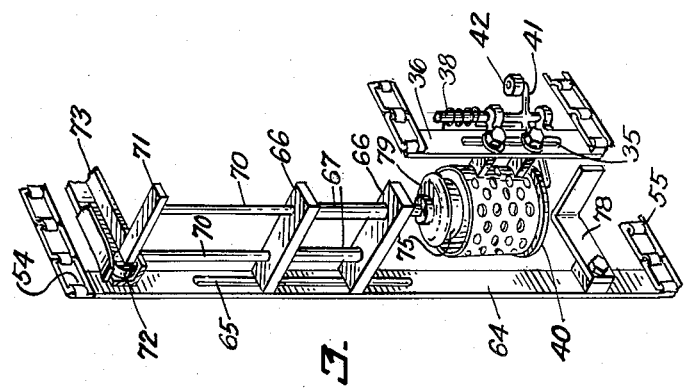
Figure 4:
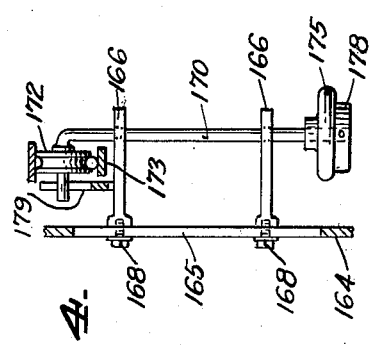

In the drawings forming a part hereof and wherein one exemplification of the machine is illustrated, Figure 1 is a top plan view of a machine embodying the principles of the invention, Figure 2 is a side elevation of the machine of Figure 1, Figure 3 is a perspective view of one of the traveling receptacles with a cooperating plunger mechanism, Figure 4 is an end elevation of an alternative means for supporting the plunger mechanism of Figure 3, Figure 5 is a vertical sectional view of one of the traveling receptacles with its supporting mechanism and uncut asparagus stalks deposited therein, Figure 6 is a view corresponding to Figure 5 showing the traveling receptacle as it moves under a trimming knife, Figure 7 shows the traveling receptacle mechanism of Figures 5 and 6 with a cooperating plunger means and a can in position to receive the contents of the traveling receptacle, and Figure 8 shows the devices of Figure 7 following the charging of the can with the stalk vegetables.

It is a common practice in the vegetable canning art to trim or cut stalk vegetables, such as asparagus, into pieces or spears of uniform length to enhance the appearance of the resulting pack and to produce a uniform or substantially uniform count in each container. Various means have been adopted by the art to speed up these operations due to the perishable nature of the products and the necessity of handling great masses of the vegetables in relatively short periods of time. It is with this practice that the present invention is concerned.

The objects of this invention are generally attained by providing a plurality of traveling vegetable receptacles or cups, arranged in endless series, traversing a plurality of loading stations at which the asparagus spears or other stalk vegetables are placed in the receptacles, spear ends down. The receptacles are perforated so that when loaded they may be passed in a continuous movement through various pre-pack treatments such as blanching, washing and the like. The operators each receptacle to substantially uniform content with asparagus spears greater in length than the depth of the receptacles and thereafter they move under a trimming knife which cuts off those portion of the stalks protruding above the top of the cups, resulting in each receptacle having a like content of stalks of identical length. Being thus trimmed to uniformity, the stalks in the receptacles progress to the can charging means within the apparatus at which point they are forced from the receptacles into the cans, to be thereafter moved on for further processing and eventual hermetical sealing within the containers.

The novel can charging means comprises a plurality of plunger members travelling in endless series and in timed relation to the travelling cups for a portion of their route through the apparatus.

One permissible form of the device is shown herein as comprising an elongated table 10 supported on legs 11 and having wings 12 projecting from its sides at selected points to provide work surfaces or stations at which the operators gather the vegetable stalk in the first step of the operation.

Travelling receptacles 13 are fixed at spaced intervals on upper and lower endless chains 14 and 15, respectively (see broken section in Figure 2), passing over sprockets 16 and 17 disposed at opposite ends of table 10. The idler sprocket 16 is keyed on a vertical shaft 20 journaled in a conventional tensioning member 21 permitting desired tightening of the chain members 14 and 15. The driven sprocket 17, on the other hand, is fixed on a shaft 22 journaled in a bearing 23 mounted on cross bars 24 which may be rigidly secured to the frame of the device in known ways. Power is supplied to shaft 22 by any source of power, such as a motor 25, through a chain drive 26 (see Figure 2).

Extending lengthwise of the apparatus between the sprockets 16 and 17 are parallel upper and lower tracks or guides 30 and 31 for the receptacle chains 14 and 15, respectively. The chain tracks are U-shaped in cross-section (see Figure 5) and take the convenient form of strips of channel iron supported between the upper ends of the legs 11.

It will thus be seen that the receptacles move lengthwise of the table 10 and traverse the stations provided by the wings 12 at which they may be filled by the operators.

The characteristics of the receptacles 13 are shown to best advantage in Figures 5 to 8, inclusive, as being cup-like in form tapering toward their bottom edges and having over-all perforations 33. Arms 34 on the receptacles extend through a slot 35 in post 36 and are bolted to the post as by nuts 37 to position the receptacle 13 in the desired vertical position with respect to the post 36.

Each of the receptacles 13 has a bottom cover 40 with a lever arm 41 connected thereto journaled in the lower arm 34. Each lever arm has at one end thereof a ball bearing mounted wheel 42 adapted to move and roll in a track 43 carried by stationary frame members intermediate the tracks 30 and 31. The wheel 42 is retained in the track 43 against the urging of a torsion spring 38 tending to pivot the arm 41 outwardly from the receptacle 13 and to concomitantly swing the bottom cover 40 away from the receptacle in the same plane in which it is normally positioned.

The track 43 is discontinuous, as shown at 44, and as the receptacles 13 reach this break in the track the arm 41 is no longer retained in position against the urging of the torsion spring 38 and accordingly swings outwardly to pivot the covers 40 away from the receptacles 13, as shown.

A sprocket wheel 45 mounted on the upper end of a shaft 46 journaled in members of the table 10 is driven by the chain 14 to cause the shaft 46 to rotate. A pulley wheel 47 keyed on the shaft 46 thereupon drives the pulley belt 50 which passes over another pulley wheel 51 keyed on a shaft 52 supported by members of the table 10, and the consequent rotation of the shaft 52 causes a sprocket wheel 53 keyed on said shaft to drive an endless chain 54 and an endless chain 55 within the guides 56 and 57, respectively, said guides being supported in spaced relation on cross members 60 mounted on the table 10. Guides 56 and 57 pass over idler sprockets 61 keyed on a shaft 62 journaled in a bearing 63 supported by cross member 60.

Chains 54 and 55 support therebetween a plurality of posts 64 having slots 65 for the adjustable bolting therein of spaced parallel bars 66 having therebetween parallel guide tubes 67 for the reception of parallel plunger rods 70 secured to a bar 71. Bar 71 is mounted on a bearing wheel 72 adapted to be rollingly supported by a track 73 having an undulant or cam portion 74 for a purpose hereinafter disclosed, said track 73 being supported by the members 60. At the lower end of rod 70 there is keyed a plunger 75 and a slidable collar 79, and said plunger is adapted to be moved into a receptacle 13 upon the downward movement of the rod 70 within the guide tube 67 when the wheel 72 rolls downwardly onto the cam portion 74 of the track 73. When the plunger 75 moves downwardly, it is in registration with a receptacle 13 by virtue of the fact that the plunger system and the receptacle system are moving in timed relation, since the plunger system is driven off of the chain 14 of the receptacle system by sprocket wheel 45.

Each post 64 has bolted near the bottom end thereof a positioning bracket 78, and below said bracket is a pair of spaced parallel guide rails 76 supported by the table 10, said guide rails leading from a star wheel 77 beneath the plunger 75 and the receptacles 13 to a star wheel 80, said star wheels 77 and 80 being keyed on shafts journaled in the table 10 and being adapted to rotate in a counterclockwise direction, as viewed in Figure 1, in timed relation with both the receptacle system and the plunger system in a well known manner.

A can chute 81 bearing a plurality of cans 82 is adapted to feed said cans into the star wheel 77, and a can chute 83 is adapted to receive a plurality of cans from the star wheel 80.

A motor 84 positioned on a platform 85 supported by the legs 11 is adapted to rotate a shaft 86 journaled in the table 10, and said shaft 86 has keyed on the upper end thereof a circular cutting blade 87 parallel to the upper edge of receptacles 13 and closely positioned thereto, as shown in Figure 6.

The invention is operative in the following manner. The motor 25 is energized to drive the chain drive 26 and rotate the shaft 22 and the driving sprocket 17 keyed thereon. The rotation of the sprocket 17 moves chains 14 and 15 in a counterclockwise direction as viewed in Figure 1 to cause the receptacles 13 to also travel in a counterclockwise direction.

As the receptacles 13 pass the packing station 12, they are filled with a plurality of asparagus stalks, as shown in Figure 5, such stalks being positioned in the receptacles with their spear ends downward. When the receptacles pass under the circular blade 87, the irregular ends of the asparagus stalks protruding from the receptacles 13 are trimmed evenly, as shown in Figure 6, whereupon the receptacles continue in their passage around the sprocket 17 and approach the plunger system.

Meanwhile, the travel of the receptacle system has initiated equal speed travel of both the plunger system and the star wheels 77 and 80, so that a plurality of cans 82 have been set by the star wheel 77 between the guide rails 76 and beneath the plungers 75 where they are picked up by the guide brackets 78 and caused to move along in registration with the plungers 75. Each plunger 75 and can 82 in spaced alignment underneath travel in spaced relation to approach the receptacle system. As the plunger system and the receptacle system come into registration because of their timed relation, each plunger 75 and its attendant can 82 come into registering alignment with a receptacle 13. As this occurs, the wheel 42 of the receptacle 13 leaves the end 44 of the track 43 to allow the torsion spring 38 to force the wheel 42 outwardly from the receptacle to pivot the bottom cover 40 of the receptacle outwardly.

Concomitantly with this pivoting of the bottom cover of the receptacle, the wheel 72 of the plunger system rides downwardly onto the cam section 74 of the track 73 causing the plunger rod 70 to move downwardly within the guide tube 67 and to bring the plunger 75 into forceful contact with the ends of the asparagus stalks in the receptacle 13. This action serves to eject the asparagus stalks from the receptacle 13 into the can 82, and the wheels 72 travel on the upgrade side of the cam section 74 of the track 73 to raise the plunger 75 out of the receptacle 13.

Each filled can 82 is then carried along by the guide bracket 78 within the guide rails 76 to the point where said can is picked off the conveyer system by the star wheel 80. When the can is picked off of the bracket 78 by the star wheel 80, it is impelled along the chute 83 for further processing.

A modification of the plunger 75, shown in Figure 3, is illustrated in Figure 4, wherein a rod 170 passes through and is secured to spaced parallel bars 166, said bars passing through a slot 165 in post 164 and being secured therein by nuts 168 to allow for vertical movement of the bars 166 with respect to the post 164. The rod 170 has keyed to the lower end thereof a plunger disc 178, and on the rod between the disc 178 and the lower bar 166 is a slidable collar 175. The upper end of the rod 170 is bent at right angles, and this right angled portion has secured thereon a flanged wheel 172 adapted to travel on a beaded track 173. On the upper arm 166 there is secured a guide member 179 having a U-shaped notch in its upper portion in which the end of the right-angled portion of the rod 170 rests. Guide member 179 serves to prevent any twisting of the rod 170 in travel tending to derail the wheel 172, thus serving the same purpose as the rod 70 adjacent the post 64 in Figure 3. The post 164 has at its extreme end portion, not shown, chain drives similar to chains 54 and 55 shown in Figure 3.

This modification is operative in a manner parallel to the plunger unit of Figure 3 with the exception that bars 166, rod 170, guide member 179, and wheel 172 all move downwardly as a single unit when the wheel 172 reaches that portion of the track 173, not shown, similar to the cam section 74 of the track 73 shown in Figure 2.

While the preferred embodiment of the invention has been shown and described, it is to be understood that modifications of this embodiment may be made within the spirit of the invention and within the scope of the appended claims. What we claim as new and desire to secure by Letters Patent is:

1. A canning machine for stalk vegetables comprising a plurality of spaced receptacles having movable bottom closures, said receptacles being adapted to be hand loaded with a plurality of vegetable units, means for moving the receptacles at a predetermined speed in an endless path, a rotary knife for trimming the units in each receptacle to a uniform length en passant, a plurality of plungers travelling in an endless path, means for moving the plungers at the speed of the receptacles in transient alignment therewith, an entrance chute leading into the machine, means in the chute for feeding a plurality of cans into the machine, means for positioning a can beneath each plunger as said plunger passes the entrance chute, means for pivoting the receptacle closures away from the receptacles, means for sequentially actuating the plunger to eject the vegetable units from one receptacle into a can, a can exit chute, and means in the exit chute to receive the loaded cans from the can positioning means and move said cans along the exit chute.

2. A canning machine for stalk vegetables comprising a plurality of spaced perforated receptacles having movable bottom closures, said receptacles being adapted to be hand loaded with a plurality of vegetable units, means for moving the receptacles at a predetermined speed in an endless path, a positioned rotary knife for trimming the vegetable units in each receptacle to a uniform length en passant, a plurality of spaced plungers, means for moving the plungers in an endless path at the speed of the receptacles so that the plungers in a portion of said endless path are in spaced alignment with the portion of the receptacles therebeneath, an entrance chute leading into the machine, means in the entrance chute adapted to move in timed relation to the receptacles and the plungers to singly feed a plurality of cans into the machine, means for positioning a can beneath each plunger in vertical alignment therewith as each plunger passes the mouth of the entrance chute, means for sequentially pivoting the receptacle closures away from the receptacles, means for sequentially actuating the plungers to eject the vegetable units from one receptacle into a can, means to sequentially pivot the bottom closures of the receptacles to the closed position, a can exit chute, and means in the exit chute moving in timed relation to the receptacles and the plungers to receive the loaded cans from the can positioning means and direct said cans along the exit chute.

3. A canning machine for stalk vegetables comprising a plurality of spaced receptacles carried by a first endless path conveyor, each of said receptacles being open at one end and being provided with a pivotable closure member at the other end, a rotary knife for trimming to a uniform length stalk vegetable units protruding from the open ends of the receptacles, a second endless path conveyor, a plurality of plungers slidably carried thereby and spaced apart a distance equal to the spacing between said receptacles, a portion of the path of said second conveyor being in offset alignment with a portion of the path of said first conveyor, driving means interconnecting said conveyors to move them in timed relation so that plungers and receptacles in the receptive aligned portions thereof are in registration, can positioning means comprising a plurality of arms carried by said second conveyor and associated with the plungers for receiving cans from a can feeder and for moving said cans in axial alignment with the plungers, means associated with the closure members of the receptacles and operable to pivot said members away from the receptacles, and cam means to actuate the plungers in alignment with the cans and receptacles to eject the vegetable units into the cans.

4. A canning machine as set forth in claim 3, wherein lever members are carried by said closure members in engagement with a discontinuous trackway, and spring means are associated with said levers and operable to pivot the closure members away from the receptacles when said levers are out of engagement with the trackway, said trackway being discontinuous adjacent the aligned portions of the paths of the conveyors.

5. A canning machine as set forth in claim 3, wherein said plungers are supported by rollers adapted to travel along a trackway, said trackway having a cam portion adapted to actute said plungers.

6. A canning machine as set forth in claim 5, wherein lever members are carried by said closure members in engagement with a discontinuous trackway, and spring means are associated with said levers and operable to pivot the closure members away from the receptacles when said levers are out of engagement with the trackway, said trackway being discontinuous adjacent the aligned portions of the paths of the conveyors.

7. A canning machine for stalk vegetables comprising a plurality of spaced receptacles carried by an endless path conveyor, a bottom closure member pivotally carried by each receptacle, lever members carried by said closure members in engagement with a discontinuous trackway, and spring means connected to said levers and operable to pivot the closure members to an open position when said levers are out of engagement with said trackway.

GEORGE SIDNEY COLEY.
    JOHN SOUSA.

REFERENCES CITED

The following references are of record in the file of this patent:

UNITED STATES PATENTS

| Number | Name | Date |
|---|---|---|
| 1,808,676 | McDonald et al. | June 2, 1931 |
| 2,127,393 | Doney | Aug. 16, 1938 |
| 2,180,349 | De Back | Nov. 21, 1939 |
| 2,319,900 | De Back | May 25, 1943 |